Aug. 16, 1955     W. C. CONKLING     2,715,417
PNEUMATICALLY OPERATED GAS FLOW CONTROL APPARATUS
Filed Feb. 1, 1949     4 Sheets-Sheet 1

Fig. 1A

INVENTOR.
William C. Conkling
BY
Robert S. Dunham
ATTORNEY

Aug. 16, 1955 W. C. CONKLING 2,715,417
PNEUMATICALLY OPERATED GAS FLOW CONTROL APPARATUS
Filed Feb. 1, 1949 4 Sheets-Sheet 3

INVENTOR.
William C. Conkling
BY
Robert S. Dunham
ATTORNEY

INVENTOR.
William C. Conkling
BY
Robert S. Dunham
ATTORNEY

United States Patent Office 2,715,417
Patented Aug. 16, 1955

2,715,417
PNEUMATICALLY OPERATED GAS FLOW CONTROL APPARATUS

William C. Conkling, Lockport, N. Y., assignor to Wallace & Tiernan Incorporated, a corporation of Delaware Application February 1, 1949, Serial No. 74,036

12 Claims. (Cl. 137—489)

This invention relates to apparatus for advancing gas, particularly for the control of gas flow, and is principally designed to provide new and improved apparatus of pneumatically operated character, for controlling and indicating the flow of a gas, for example in feeding a reagent gas or the like from a source of supply to a point of use or application. In an important specific aspect the invention is concerned with equipment of the type wherein the conduit structure for gas flow includes a suitable resistance, e. g. an orifice, together with means for adjusting pressure conditions in the conduit so as to regulate the rate of gas flow by controlling and indicating the pressure drop across the resistance.

In prior apparatus of the sort last mentioned, it has been proposed to effectuate the control by maintaining an approximately constant pressure on one side of the fixed orifice, say the up-stream side, and then adjusting the pressure in the conduit on the down-stream side of such resistance, in order to vary the pressure drop across the latter and thus presumably change the rate of gas flow in accordance with the known relationship of flow to pressure drop. One important form of apparatus in which such structure has been utilized and to which the present invention is specially applicable has been designed for treating the contents of a water main or the like with a gas such as chlorine, e. g. for purification in water supply systems and sewage treatment systems. In the chlorine feeding apparatus, an effective arrangement has been to provide an aspirator in a minor stream of water leading to the main under treatment, the aspirator establishing a vacuum or "negative pressure" which draws the gas from the source through the fixed orifice (sometimes called a metering orifice), the flow-controlling pressure drop across the latter being adjusted by changing the pressure at its down-stream side. At the up-stream side, the gas is caused to traverse a chamber supplied with water to a level determined by the pressure, usually sub-atmospheric, therein; the gas inlet to the chamber is customarily adjusted by a float valve designed to provide approximate constancy of such pressure, i. e. on the entering side of the orifice. For indication of the rate of gas flow the apparatus commonly has manometers showing the pressures on both sides of the orifice, from which the flow rate is determinable.

While apparatus of the character stated has been in many respects highly perfected, some problems have remained or arisen, for example relating to the attainment of a higher order of accuracy in gas flow control, to rapidity and fidelity of response upon adjustment, to simplicity of flow indication, and to prevention of the escape of chlorine fumes around the apparatus, at least a number of these problems being particularly serious in devices required to handle a relatively high rate of gas flow, an example of such operation, in chlorination equipment, being the supply of chlorine at rates ranging upward of three pounds of gas per hour. Thus for instance while it has been intended to achieve an approximately constant pressure, e. g. a specific small vacuum, a head of the metering orifice, the nature of float-controlled or corresponding means for accomplishing such regulation has inherently prevented the attainment of substantially true constancy, especially if hunting and fluctuation are to be avoided. On the down-stream side of the orifice, a variety of means have been used for adjusting the vacuum in the conduit, for instance involving a float-controlled throttling valve or the like, which has been adjusted by a pressure controlling instrumentality transmitting its changes of pressure through a hydraulic water leg that extends to the valve-operating float chamber. It is found, however, that friction loss in the water leg and the inertia of the liquid and float in the controlled chamber may tend to interfere somewhat with rapidity or accuracy of response in making adjustments of chlorine flow.

In consequence, an important object of the present invention is to provide improved apparatus of the character described, affording more accurate, rapid and reliable adjustment of gas flow, even in handling relatively large rates of gas feed. Another object is to provide a more exactly constant pressure on the up-stream side of the metering resistance, and especially to maintain such constancy of pressure, regardless of changes in gas supply pressure at the source or in pressure in the conduit beyond the orifice, and especially to provide such constancy while maintaining stability against unwanted fluctuation, hunting or the like in response to transient variations of condition. Thus the apparatus of the invention is designed to achieve a truly constant pressure at the entering side of the orifice, over a wide range of adjustments of flow, viz. a wide range of pressures down-stream of the orifice; under such circumstances, and with atmospheric conditions remaining constant, the density of the gas ahead of the metering orifice is constant and the rate of flow at any time is very accurately represented by the adjusted value of pressure beyond the orifice. In consequence high accuracy of flow control is achieved throughout the range of flow adjustment and regardless of considerable change in the pressure of the gas at its source, i. e. ahead of the apparatus. At the same time, simpler, more useful and accurate indication of the rate of flow can be obtained, a further object of the invention being to provide improvement in measurement and indication of flow in apparatus of this character.

Another important object is to afford novel and peculiarly effective structure for the adjustment of pressure in the conduit structure down-stream of the metering resistance, particularly to provide a device which responds practically immediately to change of the controlling instrumentality and in which the controlling instrumentality, as well as its transmission of adjustments to the controlled device, may be of a novel and simplified character, permitting ease of operation and ready adaptability to operation at a remote locality or by time-controlled or other automatic means.

Further objects are to provide apparatus of the character stated having a simple and mechanically convenient structure and yet affording full confinement of chlorine gas and especially of water which may contain such gas and thus release it to the atmosphere, so that essentially none of the reagent can be dissipated into the atmosphere immediately around the equipment. Accomplishment of this object is of special importance where the gas being fed may have toxic or corrosive effects, i. e. respectively to personnel and other equipment in the room or building which houses the apparatus.

An additional object is to provide apparatus of the sort described, including novel and improved means for appropriate response to abnormal conditions, and including new arrangements for rapidly shutting off the apparatus either in response to an unusual and sudden pressure change, or by manual operation, or by automatic control.

Other objects include the provision of such apparatus which is reliable and of rugged construction, having its operating parts conveniently accessible and easy to inspect, and permitting accurate, rapid and stable control of the flow of gas to a particular, desired rate, regardless of considerable pressure changes either ahead of or beyond the apparatus, the adjustment of the rate of flow being preferably effected in cooperation with visible means to measure such rate and indeed to represent both the actual adjustment of the control medium and the change in flow governed thereby.

To these and other ends, a presently preferred embodiment of the invention is shown in the accompanying drawings and hereinbelow described, such embodiment being presented by way of illustrative example, from which the principles and features of the invention can be readily understood.

Referring to the drawings.

While the present improvements are applicable to various kinds of apparatus and for the control or feeding of other gases or gas under other pressure conditions above and below atmospheric, and while certain features and sub-combinations of the invention may be useful separately or in other relationships, the illustrated structure is, for purposes of example, designed to provide feed of chlorine gas, at a carefully regulated rate, adjustable over a wide range, for introduction of such gas into a flowing stream of aqueous liquid. Indeed, under such circumstances the invention is of special utility, for example as it avoids undesirable effects of such gas and particularly as it includes structure for prompt, accurate and reliable gas flow control within a range of sub-atmospheric or negative pressures found convenient in equipment for such purpose.

Figure 1A:
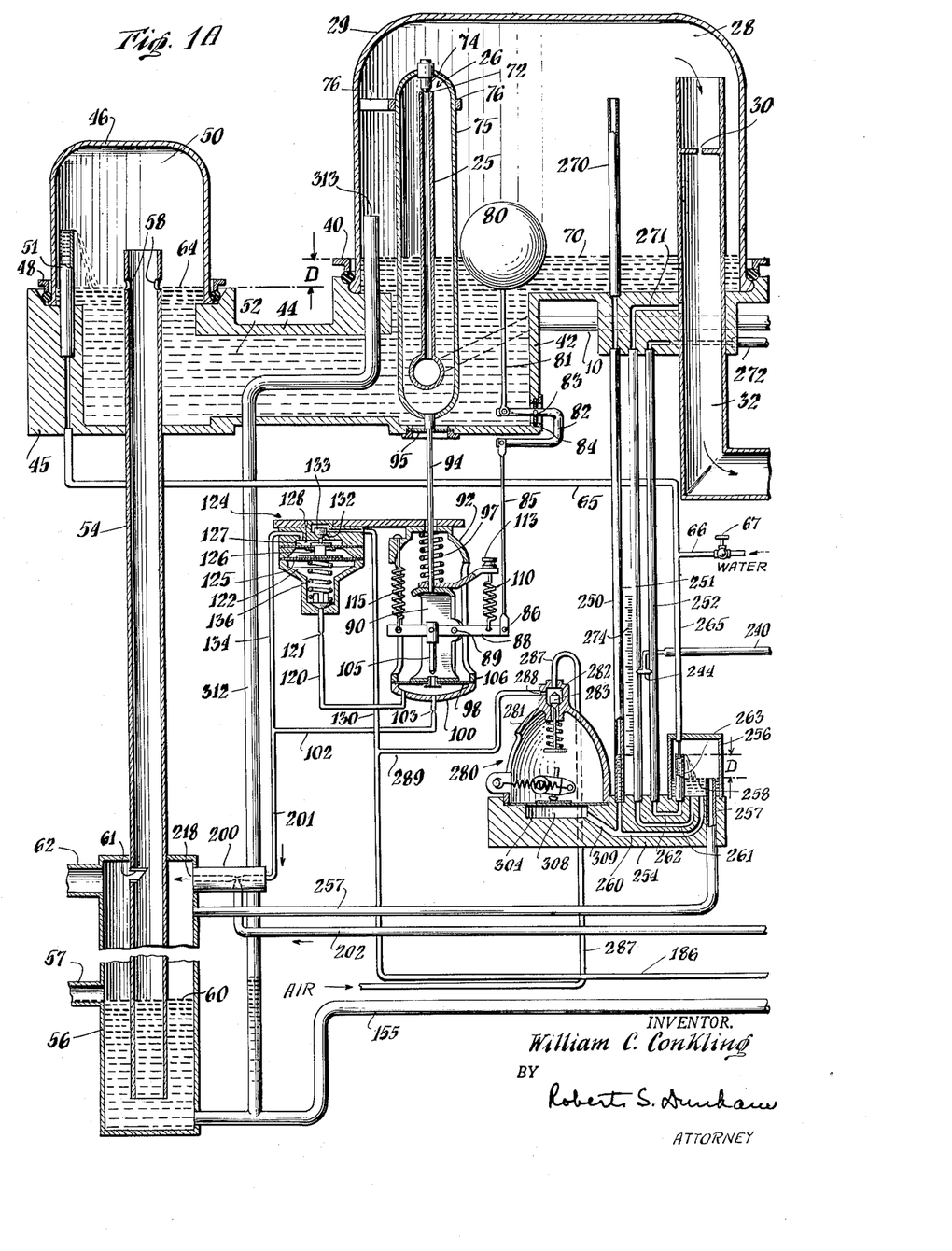
Figs. 1A and 1B represent a view, chiefly in vertical section but partly in diagrammatic manner, showing essential features of an apparatus incorporating the invention, it being understood that these figures constitute a single view, divided on a line at the right-hand side of Fig. 1A and the left-hand side of Fig. 1B.
Figure 1B:
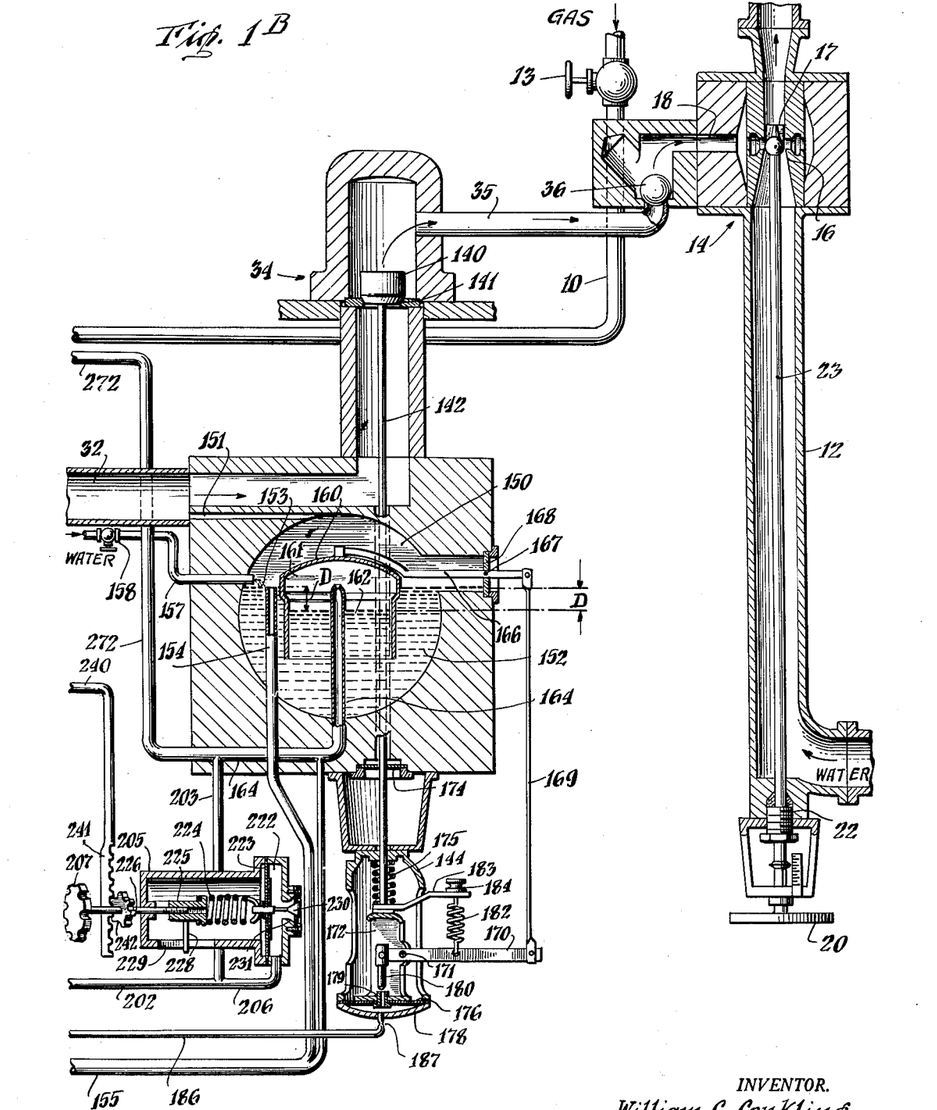

Referring to Figs. 1A and 1B, the specific apparatus shown is designed to receive gas, e. g. chlorine, through an inlet pipe 10 and to deliver the gas into a stream of water traversing a pipe 12. Entering the tube 10 through a valve 13, appropriate for shut-off or other purposes, the gas is derived from a suitable source, such as a cylinder or tank (not shown) where it may be kept under relatively high, i. e. super-atmospheric pressure. The water pipe 12 includes an aspirator or injector 14 which has a narrow throat 16 further reduced by a central plug 17 and also has a passage 18 leading to the throat, all so arranged that the flow of water through the pipe 12 and the aspirator throat creates a considerable suction or vacuum in the passage 18. Through the pressure controlling means hereinbelow described, the vacuum or negative pressure developed at the aspirator is used to draw gas from the line 10 at the desired rate of flow and to effect its injection into and mixture with the water stream in the pipe 12. The stream in the latter may represent a so-called minor flow into which a relatively large concentration of chlorine is introduced, the pipe 12 then extending, i. e. beyond and above the aspirator 14, to the water main, sewer conduit or other vessel (not shown) into which chlorine is thereby introduced for use, for example in the case of drinking water, in the usual low concentration of not more than a few parts per million.

The extent of suction or negative pressure developed by the injector 14 may be regulated by a hand wheel 20 which through a threaded connection 22 serves to move a shaft 23 carrying the plug 17, i. e. to adjust the latter in a vertical direction for altering the suction effect in or from the throat 16. It will be understood that adjustment of the hand wheel 20 is usually only necessary when the apparatus is first put into operation, the negative pressure developed at the aspirator being set at a higher value, i. e. a greater vacuum, than any controlled value which is to be employed up-stream of the aspirator, e. g. even at maximum gas flow.

The conduit system or structure through which the gas passes from the inlet pipe 10 to the injector passage 18 includes: a vertical tube 25 terminating in a pressure regulating or reducing valve generally designated 26 and contained in a chamber 28 enclosed by a bell jar 29; a calibrated orifice 30, which is the so-called metering orifice or resistance, and through which gas passes from the chamber into a conduit 32; a throttling valve 34, a further pipe 35 and a ball check valve 36 from which the gas enters the passage 18. The valve 26 serves to reduce the pressure of the gas from its high positive value at the source to a suitable state, conveniently a small negative value (under the suction of the aspirator) which is kept constant, i. e. in the chamber 28, by the instrumentalities described below. The orifice 30 effects a drop in the pressure of the gas traversing it, the lower pressure (i. e. greater vacuum) on the down-stream side being controlled by the throttling valve 34 which is thus adjusted, by a further means explained below, to set the gas flow at a desired value, or to change it as the operator may wish. In other words, the feed of gas to the injector is adjusted by changing the pressure drop across the orifice 30, and can be measured by the amount of such drop.

The bell jar 29 has its bottom edge sealed by a clamp 40 in a conforming recess around the top of a tray-like vessel designated 42, which in turn communicates freely through a relatively large passage 44 with a like vessel 45 having its open top enclosed by a bell 46 similarly sealed in place by a clamp 48. The assembly 46, 45 thus provides an auxiliary chamber 50 which has its upper portion kept at atmospheric pressure as explained below. For ready observation of the operation of various parts, the bell jar 29, the bell 46 and numerous other elements of the apparatus may be constructed of glass or other transparent material suitably inert to chlorine.

From a tube 51 rising into the space under the bell 46, water constantly overflows into the lower part of the chamber 50 and specifically into the body of water 52 which is continuously maintained there and in the passage 44 and the tray 42. A relatively wide overflow tube 54 extends down through the floor of the vessel 45 and opens near the bottom of a closed waste chamber 56, specifically below the level of a drain pipe 57 through which water may be continuously drained away to a disposal locality, at least outside of the room in which the apparatus is located. At its upper end the drain tube 54 extends vertically within the chamber 46 and has in its side wall a plurality of slots or holes 58 through which water from the body 52 continuously overflows as further water is introduced from the pipe 51. Within the waste chamber 56 but above its water level 60, the waste tube 54 has a side opening 61 so that the space within the tube communicates with the space in the chamber 56 and also with an outlet passage 62 that may extend from the top of the chamber 56 through further pipe or hose (not shown) to the outside air, preferably at a place outside the building. By the above arrangement, the chamber 50 is maintained at atmospheric pressure, but without gaseous communication between it and the immediate vicinity of the apparatus. At the same time the overflow openings 58 keep the body of water 52 at a constant level 64 in the chamber 50, while the overflowing water, which is far less than sufficient to fill the tube 54, drains into the chamber 56 and out through its discharge passage 57. Thus even though chlorine gas may become dissolved in the body of water 52, such water is not exposed and there is no opportunity for chlorine to diffuse from it into the air of the room. Continuous supply of water to the pipe 51 is maintained through a feed pipe 65 and an inlet pipe 66 having a shut-off and regulating valve 67 and extending to a water main or other source, not shown.

As indicated above, the pressure in the bell jar chamber 28 is maintained at a slight negative or sub-atmospheric value, which may be selected at any desired amount, for instance equal to a head of a few inches of water, one useful example of such value being two inches. In consequence the water in the tray 42 under the bell jar stands at a level 70 which is higher than the atmospheric level 64 (governed by the atmosphere) by the selected value, e. g. a vacuum of a few inches or so, here represented by the distance D.

The pressure regulating valve 26 comprises the upper end of the tube 25 shaped to form a seat 72, and a cooperating valve element or stem 74 carried by a yoke 75 which is mounted or disposed to slide in a vertical guide 76, so that the yoke 75 can be reciprocated up and down to move the valve element 74 away from or toward the seat 72 and thus increase or decrease the valve opening. For control of the valve, the water level 70 in the bell chamber 28 provides useful detection or translation of the gas pressure there. Responsive to the detected effects, a ball float 80 rides in the water under the bell jar and has a downwardly extending stem 81 pivoted to one arm of a laterally disposed U-shaped link 82, the same arm of the link being pivoted at a central point 83 thereof, to a wall of the vessel 42, and the pivotal mounting of the U-link 82 and the passage through which it enters the vessel being conveniently sealed by a flexible diaphragm 84. The other arm of the U-link 82 is pivoted to a depending link 85 which is in turn pivoted at 86 to the outer end of a lever 88. The lever 88 is pivotally mounted at 89 to a movable yoke 90 in a pneumatic drive or operating unit generally designated 92, for adjustment of the valve 26. The yoke 90 carries an upstanding stem or rod 94 which traverses the bottom of the vessel 42 through a flexible sealing diaphragm 95 and which is secured to the lower extremity of the valve yoke 75.

Figures 2, 3:
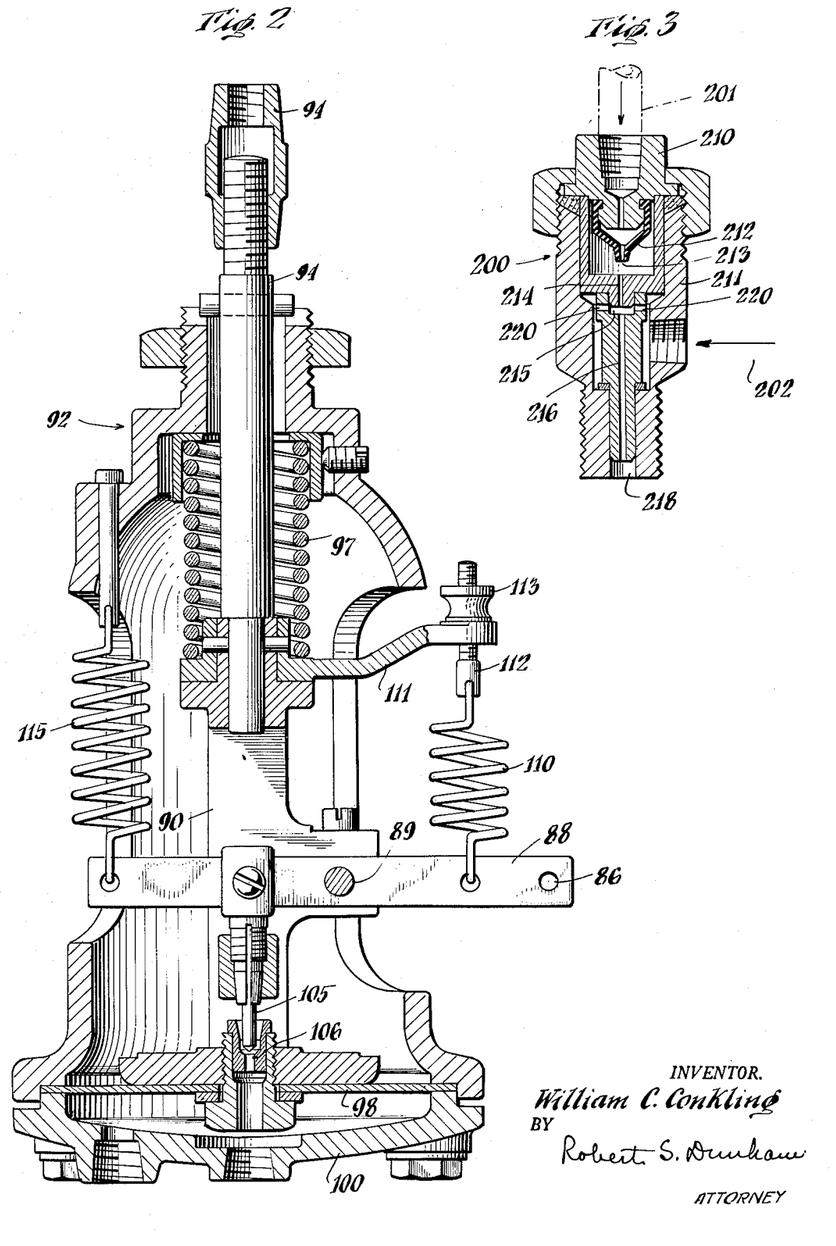
Fig. 2 is an enlarged vertical section of a pneumatic valve-adjusting device embodied in the apparatus.
Fig. 3 is an enlarged vertical section of an air aspirator conveniently used in the system of Figs. 1A and 1B.

Referring to Figs. 2 and 1A, the device 92 also includes a relatively powerful spring 97, under compression between the top of the yoke 90 and an upper part of the frame of the pneumatic device, so as to bias the movable assembly including the rod 94 and the yoke 75 in a downward direction, i. e. toward closed position of the valve. The lower end of the yoke 90 is secured to the central part of a flexible diaphragm 98 which has its lower face enclosed by a chamber 100 to which compressed air is supplied through a tube 102 having an orifice or pressure-dropping resistance 103 upstream of its opening into the chamber 100. Thus the chamber 100, constituted by the plate so designated and the diaphragm clamped between the latter and the main body of the device 92, constitutes an expansible chamber wherein the force of the air supplied through the tube 102 is exerted upwardly on the diaphragm, against the force of the spring 97 and in a direction to open the valve 26 to a controlled extent.

For effectuating such control of the diaphragm the lever 88 carries, depending from its arm on the other side of its pivot 89 from the point 86, a needle valve element 105 adapted to engage in a valve seat or opening 106 which traverses the center of the diaphragm 98; thus the amount of force developed on the diaphragm 98 is determined (for a given condition of air supply) by the extent to which the valve 105 is closed. It will be further appreciated that in a valve arrangement of this type any closure of the valve, occasioned as by rocking the lever 88 counterclockwise about its pivot 89, causes pressure to build up rapidly within the chamber 100, advancing the yoke 90 against the spring 97. Upon relief of the lever, permitting the valve to open sufficiently, the motion of the diaphragm and yoke is interrupted, the arrangement coming to rest with the valve open just so much as permits enough air to bleed through the opening 106 as will keep the assembly in its new position of adjustment. By downward motion of the float 80, the valve opens wider and the air no longer holds the diaphragm; thus the spring 97 drives the assembly downward until the valve opening 106 is sufficiently re-engaged by the valve element 105 to reduce the escape of air and bring the structure to rest.

The drive unit also includes a spring 110 disposed under tension between the lever 88 at a locality near the link pivot 86 and an arm 111 projecting from the movable yoke 90, the upper end of the spring being secured to a threaded rod 112 held in the arm 111 by a nut 113, so that the tension of the spring 110 can be adjusted by turning the nut. Another spring 115 is also disposed under tension between the opposite end of the lever 88 and the body of the device 92. Springs 110 and 115 thus both pull on the lever 88 and are arranged in substantial balance of their forces, their chief purpose being to prevent over-shooting of the float-controlled, pneumatic valve-actuating device.

The general or underlying mode of operation of the described parts for control of the valve 26, specifically in response to change in pressure, i. e. vacuum, in the chamber 28, may now be considered. For instance, if there is an increase or decrease in the pressure of gas supplied to the tube 25, there will be a corresponding tendency to increase or decrease the pressure (or inversely, the vacuum) under the bell jar and a like tendency for the water level 70 to fall or rise. Similarly if the suction or negative pressure beyond the orifice 30 is increased or decreased, for example by adjustment of the throttling valve 34 to increase or decrease the flow of chlorine gas, there is a consequent tendency to decrease or increase of pressure (or inversely, of vacuum) under the bell jar and an incipient rise or fall of the water level 70. In every instance where the water level tends to rise, restoration of the vacuum to its original value requires a determinable further opening of the valve 26, and where the level tends to fall, a closing of the valve to a controlled extent.

Assuming for instance that the vacuum under the jar, i. e. in the chamber 28, begins to increase and the water level 70 thus to rise, the ball float 80 correspondingly starts to move upward rocking the U-lever about its pivot, moving the link 85 upwardly and rocking the lever 88 counterclockwise so as to move the needle valve 105 toward closed position. The diaphragm 98 is then driven upward in the manner explained above, moving the valve element 74 further away from its seat 72 until the excess vacuum in the chamber 28 is relieved and the rising tendency of the water level 70 is interrupted. When the force tending to move the ball float 80 upward is thereby sufficiently relieved, the closing force on the needle valve 105 is reduced enough to bring the parts to rest in the new position of adjustment, as also explained above. The opening of the valve 26 has thus been adjusted in a direction to restore the pressure under the bell jar to or toward its original value D, for example, allowing sufficient flow of gas from the tube 25 to compensate for the changed condition of flow or the change of pressure elsewhere in the system. As will now be apparent, a rise of pressure (decrease of vacuum) in the bell jar will operate the pneumatic device in the reverse manner, to reduce the opening of the valve.

Generally speaking, all changes in the negative pressure under the bell jar, which might lead to a compensating adjustment of the valve 26, may be classified in two categories, the first being relatively momentary or transient changes, which commonly restore themselves and which require at most a temporary and usually minor adjustment of the valve 26, if indeed any substantial adjustment is needed at all. The second class of changes may be defined as of a permanent character, e. g. occasioned by relatively continuing change in the pressure of the supplied gas, or by such change in the pressure down-stream of the orifice 30 as arises whenever an adjustment of gas flow is to be made.

Against changes of the first category it is desirable that the apparatus include damping means of suitable character, to prevent hunting or over-shooting and generally to afford a stable condition of the valve 26 and of the feeding apparatus rather than an exaggerated response to minor and transient fluctuations. At the same time it will now be appreciated that the float 80 and valve element 74, being linked by the described means including the pneumatic unit, act to rise and fall in unison, i. e. almost as if they were rigidly connected, so that upon rebalance at a changed position of the valve element the float is similarly changed in position and thus inherently tends to require or permit a substantially equal change in the water level 70. Under such circumstances rebalance is effected, not at the original pressure, but at a new and somewhat different pressure. While the change for some purposes may be relatively minor, it is extremely desirable, especially in a device to operate at high flows, that the pressure under the bell jar be kept as precisely constant as possible. At the same time, the inclusion of damping means appropriate for minimizing hunting and exaggerated response to minor variations tends to increase the effect last described, i. e. the extent of actual change of water level which occurs before balance is reached. Avoidance of damping and the like tends to promote accuracy and sensitivity in a device of this character, but under ordinary circumstances such result involves a serious and undesirable loss of stability, i. e. against variations of the first category. In accordance with the present invention, damping devices are provided, but also special means, operable for pressure changes of the second or permanent class, to counteract the tendency of the apparatus to rebalance at other than a single predetermined pressure.

Referring now more particularly to the damping structure, it is essentially provided by the springs 110, 115 and by the resistance of the diaphragm 84 to angular movement of the link 82 about its pivot 83. Assume again that the vacuum in the chamber 28 increases, tending to raise the water level 70. By the operations described above, the resulting force on the float 80 starts the pneumatic device 92 and adjusts the valve stem 74 to a new position. If the several connections of the float valve, including its link 82 and the lever 88, were entirely unrestrained, the new position of the float 80 would effectuate a change in the water level substantially equal to the positional change of the valve element 74, the latter change being followed and equalled (if the angular motion of the lever 88 is neglected) by the vertical displacement of the float. However, the stiffness of the diaphragm 84 requires force to bend it, in proportion to the angular displacement of the link 82, and the spring 110 decreases its upward force on the float ball 80 to the extent that the lever 88 pivots counterclockwise. Both of these effects inhibit free rise of the float, i. e. act as if to produce a decrease in its buoyancy, so that the water level must rise slightly higher than theoretically indicated above in order to cause the greater submergence of the float ball 80 which is thus required at the position of rebalance. It will be appreciated that the spring 110 and diaphragm 84 have a similar effect upon variations in the opposite direction, i. e. upon decreases of vacuum in the chamber 28. In the case of the spring 110, for example, clockwise motion of the lever 88 increases the upward force on the float ball 80, as if its buoyancy were increased, so that the water level can and will drop relative to the ball to reach a rebalanced condition.

Despite this exaggeration of water level change (which would occur upon response to a continuing and substantial change of gas conditions in the conduit), the restraining effect of the diaphragm and the spring 110 contribute materially to stable pressure regulation in the bell jar chamber 28; i. e. upon momentary or transient changes, the response is highly damped and there is no over-shooting and in fact not more than a minimum of response to fluctuations of the self-correcting sort. In other words, for temporary or transient changes there is no appreciable, permanent adjustment of the valve opening, nor of the water level, while the described effect of the damping instrumentalities, although theoretically requiring some change of the water level and pressure, actually tends to delay or prevent such result in response to momentary fluctuation of gas conditions in the chamber.

The spring 115 also has a restraining effect for momentary fluctuations that may be transmitted to the lever 88, but its effect on the buoyancy of the float ball is opposite to that of the other damping instrumentalities. For example upward motion of the yoke 90 relative to the housing of the device 92 reduces the extended length of the spring 115 and its downward force on the float ball as transmitted through the lever 88; in consequence this change in spring force for an over-all change in position of the valve stem 74 tends to reduce the requirement for rise of water level. While such operation of the spring 115 has a desired damping effect for certain conditions of fluctuation, it has a tendency to impair the stability which is afforded by the spring 110, by the stiffness of the diaphragm 84 and by the location of the fulcrum point 89 on the movable yoke 90. In consequence the influence of the restraining elements last mentioned is preferably proportioned (by suitable design of these elements as will now be understood) to be sufficiently greater than the influence of the spring 115, as to insure high stability.

As indicated above, the temporary or transient fluctuations are insufficient, under the stabilized operation just described, to effect any appreciable change in the pressure of the chamber 88 or the water level 70. It has also been pointed out that because of the mechanical association causing the float 80 to follow the actual positional adjustments of the valve element 74 and because of the above described effect of the damping means in tending to exaggerate the displacement required of the water level upon an adjustment of the valve, the regulatory operation of the adjusting means in response to substantial and permanent change of flow conditions results in an appreciable change in water level, and thus in pressure under the bell jar, upon each rebalance.

While the departure may be small enough for an approximation of pressure constancy it is nevertheless sufficiently great to interfere with simplicity or high accuracy of gas flow control, or at least to interfere with attainment of desired convenience and simplicity in effecting and measuring changes of flow, especially under conditions of large gas flow. In accordance, therefore, with the present invention, there are provided means controlled by the valve adjusting device, and in response to a detected departure of pressure conditions in the chamber from the desired value, for modifying the positional relationship of the parts, including that of the float ball 80, to the water level 70. These instrumentalities are designed to function in a somewhat delayed manner, i. e. for response only to a permanent or continuing change in gas conditions, so that they do not interfere with the stabilizing function of the other devices described above.

More particularly, the air chamber 100 is connected by a tube 120 having a damping orifice or resistance 121, to a static air chamber 122 in a compensating pressure regulator generally designated 124. One wall of the chamber 122 is constituted by a flexible diaphragm 125 which at its center is rigidly coupled by means 126 to the center of a smaller flexible diaphragm 127 enclosing an upper chamber 128. Compressed air, i. e. air under pressure, is supplied to the upper chamber through a tube 130 and a pressure regulating valve or adjustable orifice comprising a seat 132 and a valve element 133, the latter being connected to the diaphragm system 127—125 so that downward motion of the coupled diaphragms (as seen in Fig. 1A) tends to close the valve or decrease the orifice, while upward motion of the diaphragms has the opposite effect. From the chamber 128 a tube 134 extends to the tube 102 and thus through the orifice 103 into the chamber 100 of the valve adjusting device 92. Hence the supply of air under pressure for operation of the latter device traverses the tube 130, adjustable orifice 132—133, chamber 128 and lines 134 and 102. The diaphragm system 125—127 of the regulating device is partially loaded by a coil spring 136 under compression beneath the diaphragm 125 in the chamber 122, i. e. exerting force sufficient to keep the orifice at least slightly open. That is to say, the force of the spring 136 is substantially constant and provides an initial regulated pressure on the diaphragm system so that the ultimately regulated air pressures may be built up as desired.

It will now be seen that the arrangement of the device 124 provides a pressure in the chamber 128 and thus in the line 134—102 which is controlled, at a regulated value, by the pressure in the chamber 122 as communicated from the operated chamber 100 of the valve adjusting device. Suppose, for example, that the vacuum in the bell jar chamber 28 rises, because of some permanent change (either by an increase of gas flow or otherwise) warranting a larger opening of the valve 26 in order to re-balance the device at the predetermined negative pressure in the chamber. Upward position of the float ball places the valve 105 toward closed position, whereupon pressure begins to build up in the chamber 100 as the air flowing into the latter commences to displace the diaphragm 98 and adjust the valve element 74 upwardly. As the pressure builds up in the chamber 100, it likewise slowly rises, i. e. with some delay occasioned principally by the orifice 121, in the regulator chamber 122. In consequence, the diaphragm system 125—127 is displaced upwardly, opening the valve 133 and permitting an increased flow through the upper chamber 127 and the lines 134—102. With the increased flow in the line 102, there is a pressure rise up-stream as well as down-stream of the orifice 103, the pressure up-stream of the orifice being essentially that in the upper chamber 128 of the regulating device.

More specifically, the regulated pressure in the chamber 128 is a function of the size of the diaphragm 127 and the load applied to the back of it by the diaphragm 125 and the spring 136. Since the spring load is essentially constant and since the area of the diaphragm 125 facing the lower static chamber 122 is substantially larger than that of the diaphragm 127, the pressure change in the lower chamber provides a multiplied pressure change in the upper chamber 128, e. g. a multiplied increase when the controlling pressure rises, and vice versa. For instance, if the ratio of the areas of the diaphragms 125 and 127 is 2:1, a pressure increase in the upper chamber will be twice that of the lower. By this means the pressure upstream of the orifice 103, and specifically the pressure drop across it are substantially increased during the operation of the adjusting device 92 and in actual response, so to speak, to the originally detected change of vacuum under the bell jar. As a result there is an increased flow of air through the driving chamber 100, and particularly a flow which is increased relative to the extent of opening of the valve 105 that is reached when the adjusting device 92 comes to a state of rebalance and rest. Since the device arrives at such state of rest when the force of buoyancy (and other forces, including those exerted by the damping devices) on the float ball 80 is so related to other forces on the lever 88 as to swing the valve element 105 to a sufficiently open position, the increased or amplified force now exerted on the yoke 90 by the diaphragm 98 so affects the response of the float ball as to bring the valve 105 to its arresting position with less force of buoyancy on the float ball than would otherwise be necessary. In other words, the adjustment terminates with the float ball in a higher position relative to the water level 70 than it occupied before the adjustment, the effect of the supplemental device 124 being thus, so to speak, to change the buoyancy of the float ball (here giving it the same buoyancy with less water displacement) or more generally, to alter its positional relationship or response characteristic relative to the pressure-responsive water level 70.

In this manner, the displacement of the ball float which necessarily follows a displacement of the valve element 74 is accompanied by a shift of the float, in like direction, relative to the water level under the bell jar. In consequence, the characteristics of the mechanical parts of the valve adjusting device are preferably selected, in a manner which will be readily understood, so that the change or modification of air pressure ahead of the orifice 103, produced by the device 124, can effect a change of regulated pressure (under the diaphragm 98) of such proportional relation as to keep the water level 70 constant for all positions of adjustment of the valve stem 74 and the float ball 80. More specifically, it is found that the several factors of the mechanical parts, including spring characteristics, valve needle and seat sizes, lever ratio, float ball size and the like, can be easily selected to make possible a variation of air pressure upstream of the orifice 103 proportional—for instance in the proportion of 2:1 (with the effective areas of diaphragms 125 and 127 then in such ratio)—to the required change of regulated pressure in the chamber 100, for the constant level effect. The positional change of the float ball relative to the water level (produced by the described action of the device 124) is thus made, in effect, equal to the actual displacement of the float ball with the valve element, i. e. exactly counterbalancing the change of water level which otherwise would have had to occur in order to bring the system to a state of rest after an adjustment.

In other words, when there is a continuing departure of the pressure under the bell jar from the desired, predetermined value (i. e., the negative value D), say an increase of vacuum (or decrease of absolute pressure), the device 92 operates in pressure-restoring direction, as by opening the valve 26 to the necessary further extent. As explained, the operation is completed with the valve and float ball in a positionally elevated position but with the water at the same, intended level 70 which it occupied at the outset of the change to which the adjustment responded. In consequence no detectable change in the pressure under the bell jar 29 has been required or permitted, yet the valve 26 has been re-adjusted to accommodate the new conditions of flow, supplied gas pressure or the like which made the adjustment necessary; and the adjustment has been truly such as to keep the pressure constant under the bell jar. It will be understood that when the vacuum in the bell jar tends to fall, requiring a closure movement of the valve element 74, the same type of modification of pressure and thus of force on the valve adjusting system occurs, i. e. a reduction in gas flow to the chamber 100 and a diminution of pressure under the diaphragm 98, yielding a decrease, in effect, of the buoyancy of the float ball and permitting it to come to rest in the desired changed position but lower relative to the water level 70, the latter remaining constant as before.

Since an upward displacement of the yoke 90 always tends to open the valve stem 105 as the ball 80 reaches a floating position of rest and indeed opens the valve progressively more and more as or if the yoke moves further upward than the float ball (all by reason of the described pivoted mounting of the lever 89), the pressure-amplifying effect of the regulator 124 is sure to be brought to a halt during an upward adjustment of the valve stem 74; by like effect of the closing of the valve stem 105 on a downward adjustment, similar termination of pressure reduction by the regulator 124 is also obtained. Such halt or termination of pressure modification is also necessarily hastened, and indeed assured, by the flow-resisting orifice 103 which itself accounts for respectively more or less of the total drop between chamber 128 and atmosphere (relative to the drop between chamber 100 and atmosphere) as the opening in the diaphragm 98 is adjusted to more open or less open condition.

In consequence of the instrumentalities now described, the vacuum under the bell jar 29 is kept essentially constant both by and with all adjustments of the valve 26 that may become necessary within the desired range of conditions. Because of the delayed or retarded response of the pressure regulating device 124, e. g. in that the resistive orifice 121 requires a relatively appreciable time for the effect of pressure change in chamber 100 to be realized in chamber 122, this instrumentality regulates at relatively slow rate and produces the stated and peculiarly advantageous results only in response to such permanent, i. e. continuing change of gas conditions as require a permanent adjustment of the valve 26. The stability of the device to transient or temporary variations is essentially unaffected, and yet when needed for a nontemporary adjustment the instrumentalities just described, including the regulator 124, serve to counterbalance the adverse effect which the stabilizing or damping means would otherwise have on the fidelity of pressure control under the bell jar. Thus the float ball 80 responds rapidly to any change in bell jar pressure, and without hunting or oscillation, effects no more than a reduced correction of all momentary deviations; for the latter, the delayed device 124 is not brought into play and thus does not interfere with the proper function of the damping system. For larger changes of conditions that occur at a relatively slow rate, the regulating unit 124 becomes effective, to permit a high fidelity of pressure-restoring adjustment. The complete combination thereby affords a highly stable control, with ample sensitivity and accuracy when needed, so as to keep the pressure under the bell jar substantially constant at all times.

In order to vary the rate of gas flow through the conduit system leading to the injector 14, the valve 34 throttles the excess of suction created by the injector to the precise amount desired on the down-stream side of the metering orifice 30. The valve 34 comprises a valve member or head 140 cooperating with a valve seat 141 and actuated by a rod 142 driven by a device 144 similar to the device 92 of Figs. 1A and 2. For control of the valve adjusting device 144 there is provided a chamber 150 which communicates with the conduit 32, and thus with the down-stream side of the orifice 30, through a passage 151. The chamber 150 contains a body of water 152, maintained at a constant level 153 by an overflow pipe 154, extending through a further pipe 155 to the waste chamber 56 where it opens beneath the level of the water, as shown, so that there can be no back flow of air. Water is continuously supplied to the chamber 150 by flow from a tube 157 connected to an appropriate main or other source (not shown) through a shut-off valve 158. An inverted cup or bell shaped device 160 is disposed within the chamber 150, being buoyed partly above the surface of the water by the volume of air contained underneath the bell, i. e. inside it at 161 and above the level 162 to which the water of the body 152 rises therein. A tubular passage 164 extends up through the bottom of the chamber 150 and opens at its top in the air space 161 underneath the bell, thus communicating with such air space.

The bell 160 is attached, e. g. at a mid-point of its upper surface, to one end of a lever 166 which is pivoted on a horizontal axis at 167 to the wall of the chamber 150, the pivot shaft and corresponding opening in the wall being sealed by a flexible diaphragm 168. The outer end of the lever 166 is connected by a long vertical link 169 to the outer end of a lever 170 which is pivoted at 171 to the yoke 172 of the valve actuating device 144. It will be seen that the lever 170 thus corresponds to the lever 88 of the device 92, the instrument 144 having other similar parts, including the sealing diaphragm 174 for the entry of the valve operating rod 142 into the vacuum space of conduit 32, a return spring 175 (corresponding to the spring 97), and a diaphragm 176 enclosing the driving chamber 178 and carrying valve passage 179 with which the needle valve element 180 cooperates, being carried at the opposite end of the lever 170 to the link 169. A spring 182 is disposed under tension between a point on the lever 170 (intermediate its fulcrum and the connection of the link 169) and an arm 183 extending from the yoke 172, the tension of the spring 182 being adjusted by the nut 184 in the same manner as the adjustment of the tension of spring 110 by the nut 113 in Figs. 1A and 2.

The device 144 operates, fundamentally, in the same manner as the device 92, in that upon any tendency of the link 169 to close the valve 180, compressed air supplied to the chamber 178, e. g. through a tube 186 including an orifice or resistance 187, then effects displacement of the diaphragm 176 and with it the valve element 140, until the result of the adjustment restores the link 169, so to speak, to a condition of stability (as further explained below), bringing the parts to rest in a new and re-balanced condition. Upon motion of the link 169 in the opposite direction, i. e. tending to open the valve 180, reverse operation of the device occurs under the force of the spring 175, effecting like downward adjustment of the valve element 140.

It will also now be seen that the described control operation of the link 169 is in turn controlled by the pressure conditions inside and outside of the bell 160, which acts as if it were a frictionless piston having different values of vacuum or negative pressure on its opposite sides. More specifically, if it is assumed that a predetermined vacuum has been maintained in the space 161 under the bell and that the force of various parts is such that the bell remains at rest with a corresponding, somewhat higher vacuum in the outer space of the chamber 150 and thus in the passage 32, a change in the pressure under the bell will produce a controlling motion of or force on the link 169. For example, if the vacuum increases in the space 161 (i. e. the absolute pressure falls), the bell 160 tends to be sucked down, pulling upwardly on the link 169 and tending to close the valve element 180. As a result and in the manner described above, the throttling valve element 140 is adjusted upwardly, opening the throttle valve 34 to a further extent and permitting an increase of vacuum in the conduit 32, viz. a greater amount of suction as derived from the aspirator device 14. In consequence the negative pressure in the line 32 increases in proportion, and in fact in equal amount, to the controlling increase of pressure under the bell 161, and by the communication of the higher vacuum in the line 32 to the space in the chamber 150 outside the bell, the parts are re-balanced at a new state of rest. The newly established pressure in the line 32 has thus been determined by the controlling vacuum in the space 161. A similar but reverse operation occurs, as will now be appreciated, when the vacuum under the bell 160 is decreased; the valve 34 is adjusted to a more closed position, reducing the suction transmitted from the aspirator and correspondingly reducing the vacuum in the conduit 32, on the down-stream side of the orifice 30.

The difference of water levels 153, 162, i. e. the constant difference in pressure or vacuum maintained between the interior and exterior of the bell 160 in the chamber 150, is determined by the equivalent weight of the bell and of its linkage to the diaphragm power unit 144, together with the force of the damping spring 182. Thus the downward force of the influences just mentioned tends to sink the bell 160, and the vacuum above the bell in the chamber 150 must be sufficiently greater to overcome such downward force at the desired difference of water levels. Most conveniently the downward force may be adjusted, e. g. by adjusting the nut 184 and changing the tension of the spring 182, so that the constant difference in pressure between the inside and outside of the bell is exactly equal to D, viz. the amount by which the vacuum under the bell jar 28 departs from atmospheric pressure.

As further explained below, this arrangement of the parts including the regulating bell 160 such that the pressure difference across the latter is exactly equal to the vacuum under the bell jar 29 has a number of special advantages. At least in part, these are related to convenience in use and measurement of such controlling vacuum as may be employed for communication to the interior of the bell 160 through the tube 164. At zero gas flow in the line 32 and through the orifice 30, the pressure on both sides of the latter should be the same, i. e. the small vacuum which is maintained under the bell jar. In consequence for such zero flow, where the pressure in the chamber 150 outside the bell 160 is equal to the stated small vacuum, viz. D, the pressure under the bell 160 will then be atmospheric. In other words, the controlling vacuum supplied to the tube 164 may conveniently vary from zero, i. e. atmospheric pressure, for a state of zero gas flow, upward through a range of values directly representative of the amounts of gas flow to which adjustment may be made.

Although any of a variety of means may be employed to furnish the desired, controllable vacuum for supply to the tube 164 and consequent control of the valve 34, and although such other means may include remotely or automatically controlled devices, to change, interrupt or initiate operation of the chlorine supply in accordance with a pre-set program or the like, the drawings illustrate one simple and effective instrumentality, that can if desired be embodied in the same structural unit as the other parts of apparatus shown in Figs. 1A and 1B. To such end, there is provided an air aspirator 200 which is supplied with air under pressure from the tube 201 connected to the compressed air supply system, e. g. the tube 134, and which produces a vacuum or suction in the successive tubes 202, 203 leading to the tube 164. An adjustable pressure relief or regulating device 205 is connected to communicate with the passage 202—203 by a tube 206 and constitutes means adjustable, e. g. by the knob 207, for varying the vacuum in the line 202—203, thereby supplied to the interior of the bell 160.

While other vacuum producing devices may be employed a simple and suitable form for the air aspirator 200 is shown in Fig. 3 and includes an inlet connector 210 through which compressed air is supplied from the connected air tube 201 to the interior of the cylindrical body part 211, the air flowing through an elastic vent or valve 212 composed of resilient material and having a slit-like opening 213 so that air traverses the device only under a definite, positive pressure, without possibility of back flow. The further path of air flow in the device extends through a narrow passage 214 past a throat recess 215 and on through a further narrow passage in the throat member 216, for discharge at the outlet 218. In order to avoid even the remote possibility of chlorine fumes coming into contact with the compressed air supply and thence reaching the vicinity of the apparatus, the aspirator 200 may conveniently discharge into the upper part of the waste chamber 56, i. e. as shown in Fig. 1A. Suction openings 220 lead from the throat chamber 215 and communicate, through an annular cavity around the throat member, to the suction or vacuum line 202. It will be understood that the device 200, as supplied with compressed air in the illustrated system, develops a suction or negative pressure in the line 202 which is greater than the maximum needed for control of the bell 160 and associated devices.

The regulating or relief valve 205 includes a chamber 222 closed by a flexible diaphragm 223 which is loaded by a coil spring 224 under tension between the center of the diaphragm and a traveling nut or sleeve 225. The axial opening of the nut 225 is threaded on a shaft 226 which carries the knob 207, the nut 225 having a lateral pin 228 riding in a longitudinal slot 229, so that as the knob is turned, the nut 225 is displaced axially without rotation and thus changes the tension of the spring 224. The diaphragm 223, conveniently from its side facing the chamber 222, is connected to a valve disc or element 230 which is outwardly disposed relative to a seat or opening 231 in the wall of the chamber. Thus as the diaphragm 223 moves to the left (in Fig. 1B) for expansion of the chamber 222, the valve disc 230 is brought against the seat 231, while reverse displacement of the diaphragm tends to open the valve and bleed air into the chamber 222 to an extent determined by the position of the valve disc relative to the opening.

It will now be seen that for any setting of the knob 207 and thus for any selected tension of the spring 224 a predetermined vacuum will be established in the line 202—203, such vacuum being determined by the extent to which it is relieved through the opening 231, the effective size of the latter being dependent on the state of balance between the force of spring 224 and the suction on the diaphragm. The vacuum is thus adjustable by the knob 207, in that increase of tension on the spring requires a greater vacuum in the chamber 222 in order to open the valve and bleed off the excess, i. e. the difference between the regulated vacuum and the maximum, so to speak, of which the aspirator 200 is capable. Likewise, reducing tension on the spring 224 requires the vacuum in the chamber and the lines 202, 203 to build up only to a correspondingly lower value, when the bleeding-off point is reached at the valve 230—231. Conveniently, the capacity of the aspirator 200 is such that the air flow through and out of the regulating valve 205 is small relative to the size of the passages (e. g. passages 202, 203 and 204) whereby the control vacuum thus established beneath the bell 160 is substantially the same as that provided in the regulating valve device 205.

Although other appropriate indicating means may be employed for the regulating valve 205, and calibrated in terms of chlorine flow through the conduit system 25—28—32—35, the drawings illustrate a particularly suitable arrangement, diagrammatically shown as including an arm 240 extending from a rack 241 geared to a pinion 242 on the shaft 226 of the regulating device. The arm 240 conveniently carries a double pointer 244 cooperating with certain manometer structure now to be described.

The flow indicating means shown in the drawings comprises three manometers 250, 251 and 252, advantageously constituted by vertical, transparent tubes extending at their lower ends to appropriate passages in a supporting block 254 and arranged in a closely-spaced, parallel array. The block 254 also carries a closed water chamber 256 into which there projects (from the bottom) an overflow tube 257 that extends into the upper part of the waste chamber 56, the tube 257 thus serving to maintain a predetermined level 258 of water in the chamber 256. The lower ends of the manometer tubes 250, 251 respectively communicate with the bottom of the chamber 256 through passages 260, 261, so that the chamber constitutes, in effect, the other leg of each of the corresponding manometers. The vertical tube 252 opens, at its lower end, in a passage 262, the latter extending to an upright tube 263 in the chamber 256 having its open end spaced above the water level 258 by a suitable distance, most advantageously equal to the distance D and thus corresponding to the small, predetermined vacuum which is constantly maintained under the bell jar 29. Through a pipe 265 connected with the water supply line 66 and projecting down into the upper open end of the tube 263 water is continuously supplied to the manometer constituted by legs 252, 263 and thus continuously overflows the tube 263 into the vessel 256 to keep the latter filled to its intended level 258 (and likewise to supply the other manometers), the excess running off through the drain pipe 257 to waste via the chamber 56.

Since the interior of the chamber 256 communicates with the atmosphere through the pipe 257, the waste chamber 56 and its atmosphere connection 62, the pressure in the chamber 256 is atmospheric, and the levels to which water rises in the connected manometers 250 and 251 thus represent the extent of vacuum or negative pressure in the devices to which these manometers are respectively connected, such vacuum being measured by the height of water column in each of the tubes 250, 251 above the level 253 of water in the chamber 256. Since the level of water in the right-hand leg 263 of the manometer constituted by tube 252 is maintained at the top of the tube 263 (at atmospheric pressure) and thus higher than the level 256 by the distance D, the water in the manometer tube 252 will, if the latter is connected to a source of vacuum, rise to a point higher than the top of tube 263 by a distance measuring the last mentioned vacuum.

The manometer 250 at its upper end communicates with the interior of the bell jar chamber 28 through a vertical tube 270, while the manometer 251 communicates through a tube 271 with the interior of the conduit portion 32, i. e. the down-stream side of the metering orifice 30, and the third or right-hand manometer 252 at its upper end communicates through a like static tube 272 with the line 203—164, containing the control vacuum applied to the interior of the valve-adjusting bell 160. Thus the manometers 250, 251 and 252, conveniently arranged in the order named, provide water levels which indicate the vacuum respectively on the up-stream side of the orifice 30, on the down-stream side of the latter and in the control line for the device which adjusts the last mentioned vacuum.

Bearing in mind that the control vacuum measured in the manometer 252 is less than the controlled vacuum in the passage 32 by an amount exactly equal to D, and further noting that by reason of the structure of the other leg 263 of manometer 252 within the chamber 256 the zero vacuum level of water in the manometer 252 is raised above that of the tubes 250 and 251 by the same amount D, it will be seen that when the apparatus is functioning in the described and intended manner, the water levels in both tubes 251 and 252 should be the same and should represent, by difference from the level in the tube 250, the amount of gas flow in the system under control. Thus the double pointer 244 may be arranged to sweep vertically along both manometers 251, 252, in cooperation with a scale 274 which can be graduated, if desired, in units of chlorine flow (e. g. pounds of chlorine per hour, or the like) ranging from a zero value at the normal, maintained level 275 (equal to D) in the manometer tube 250.

By this arrangement of manometers, a full and continuous check is afforded of the states of vacuum or negative pressure at various significant localities of the apparatus, i. e. on both sides of the metering orifice and in the control device for adjustment of the gas flow. As stated, the vacuum under the bell jar, up-stream of the orifice 30, is kept very exactly constant in normal operation. The difference of pressure across the orifice is thus simply read as the level of water in the tube 251, i. e. above the constant level or zero reference point afforded by the water in tube 250 and the corresponding zero marking of the scale 274. As already explained the vacuum provided in the control line 164 and read on the manometer 252 should keep the liquid in the latter at exactly the same level as that reached in the manometer 251.

Thus to change the flow of chlorine gas through the apparatus, all that is necessary is to turn the knob 207, thereby moving the arm 240 and the pointer 244. The levels of water in both manometers 251 and 252 should follow the pointer 244 quite exactly, the level in the manometer 251 serving as actual indication of the condition of gas flow, and the level in the manometer 252, as well as the position of the pointer 244, serving to indicate that the control devices are functioning in the proper and intended manner, i. e. so long as these last-mentioned indications substantially correspond with that of the manometer 251. A convenient and easily read indication is thereby afforded, both of the actual flow of gas at all times and of the desired functioning of various parts of the equipment.

Figure 4:
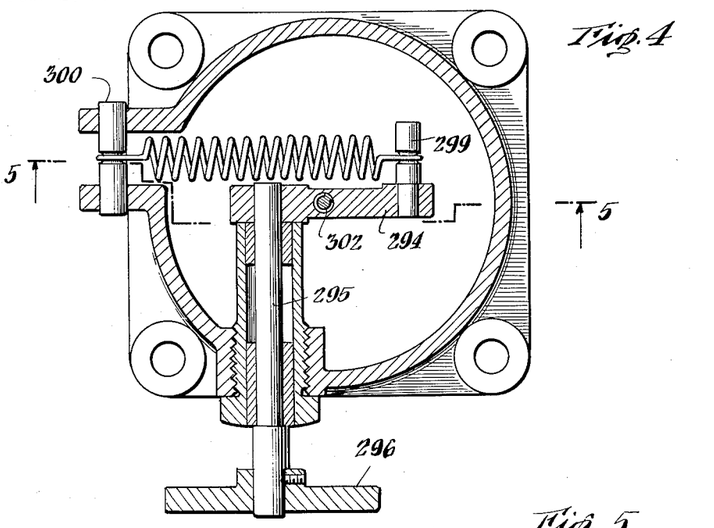
Fig. 4 is a horizontal section of a shut-off device shown in Fig. 1A.
Figure 5:
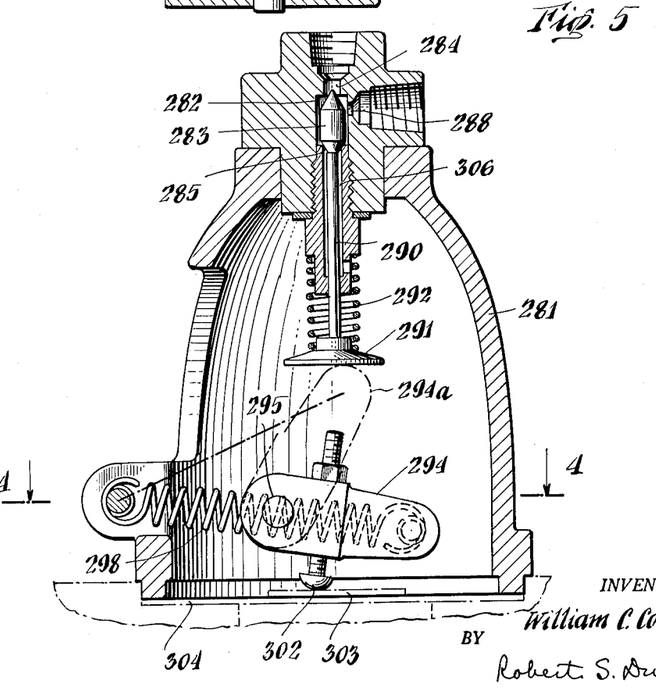
Fig. 5 is a vertical section of the device of Fig. 4, taken on line 5—5.

While other means may be provided for control of air flow and other auxiliary instrumentalities, the illustrated apparatus also includes a quick-acting shut-off valve generally designated 280 and shown in Figs. 1A, 4 and 5. This device includes a body structure 281 having at its upper end a valve recess 282 enclosing a vertically movable valve element 283 shiftable to close either an upper valve seat 284 or a lower seat 285. Compressed air for the several auxiliary devices is supplied (from a suitable source, not shown) through a main tube 287, entering the valve chamber 282 through the opening of the valve seat 284. The outlet from the chamber 282 extends through a side port 288 and a tube 289 from which the pipes 130 and 186 may lead. The valve element 283 has an operating stem or rod 290 terminating in a plate or head 291. A coil spring 292 under compression against the head 291 normally holds the valve stem 290 in the lowermost position, as shown, with the valve element closed against the lower seat 285 and the upper seat thus open for communication of compressed air from the supply through the lines 287 and 289 to the operating devices described above.

At the lower part of the body 281 a cam arm 294 is mounted on a horizontal shaft 295 which carries a knob 296 for manual operation. A coil spring 298 under tension between a post 299 at the outer end of the arm and a like post 300 near the base of the body structure 281 on an opposite side of the shaft 295, normally holds the cam arm 294 just below dead center, so to speak, of the shaft 295. That is to say, the spring 298 serves as a toggle spring for the cam arm 294, holding the outer end of the latter at a locality just below the common plane of the shaft and the other end of the spring, further travel of the cam arm below such plane being prevented by the engagement of a pin 302 on the cam with a central plate or button 303 on the upper surface of a flexible diaphragm 304 which extends across a lower part of the device.

It will be apparent that upon a slight turn of the knob 296, i. e. so as to rotate the shaft 295 in a counterclockwise direction as seen in Figs. 1A and 5, the cam arm 294 will move rapidly around through the broken line position 294a (Fig. 5) striking the head 291 and shifting the valve stem 290 upwardly, the force of the spring 298 being considerably stronger than the spring 292. By this snap-action, the valve element 283 closes against the seat 284 shutting off the supply of compressed air to all of the auxiliary devices, and at the same time permitting excess air to bleed out of such devices through a passage 306 around the stem 290, the valve seat 285 now being open. With the air supply shut off, operation of both the devices 92 and 144 will be interrupted, causing the valves 26 and 34 to close promptly and fully, and isolating the apparatus from further chlorine flow and from aspirator suction, until the device 280 is manually reset. In such fashion the entire gas feeding apparatus may be quickly shut down, by a single manual operation.

As stated, the lower part of the shut-off device 280 includes a flexible diaphragm 304. This diaphragm covers a horizontal chamber 308 which communicates (Fig. 1A), through a passage 309, with the passage 260 in the block 254, i. e. the lower end of the manometer tube 250 that opens in the bell jar chamber 28. The chamber 308 will be normally filled with water from the connected passage and will be normally quiescent, exerting insufficient force on the pin 302 to disturb the desired, set position of the cam arm 294. However, if some abnormality of or in the apparatus should cause a sudden, positive pressure surge in any part of the conduit structure which normally contains chlorine under negative pressure, such pressure surge will be transmitted through the manometer tube 250, passage 309 and chamber 308 to the diaphragm 304. The latter, being thus sensitive to pressure in the bell jar chamber (and through it, to pressures in subsequent parts of the gas conduit) will be at least momentarily elevated or expanded by a sudden increase of pressure, triggering the toggle-type arm 94 and causing the spring 298 to snap it upwardly in the manner previously described for closing operation of the valve 283—284. As a result the apparatus is shut down and the flow of chlorine is interrupted.

Although other devices for controlling the air line 287—289, including remotely-controlled solenoid valves, program-operated devices or the like may be employed and may serve to turn the chlorinating equipment on and off according to a desired schedule or other plan, the illustrated device affords a simple and efficient example of the manner in which the apparatus can be positively controlled to start and stop its operation.

It may be noted that if any considerable over-pressure should develop in the chlorine-carrying conduit structure (e. g. the chamber 29, conduit 32 or passage 35) before the valve device 280 might operate, such over-pressure is automatically relieved simply by forcing water from the tray 42 out through the passage 44, vessel 45 and openings 58, down in the drain tube 54 and to waste. The chlorine gas in mixture with and following the water thus separates out in the chamber 56 and passes harmlessly outdoors through the relief passage 62.

Simple means may also be incorporated for relief of any excess suction, by air flow from the atmosphere. For cooperation with such means there may be provided a tube 312 extending from a lower part of the waste vessel 56, below the water level therein, up through the bottom of the tray 42 and opening at 313 in the bell jar chamber 28 somewhat above its normally constant water level 70. If, for example, an unrelieved excess of suction develops under the bell jar, the water level in chamber 46 is accordingly depressed, allowing air to bubble through the passage 44 up into the bell jar, where such air can pursue the path normally followed by chlorine gas to the aspirator, viz. through the orifice 30, passage 32 and valve 34. The excess water forced into the tray 42 and upwardly in the bell jar 29 by the air flow, discharges into the opening 313 of the drain tube 312, running down said tube (normally sealed by the water in chamber 56) to the waste outlet. It will be appreciated that under appropriate conditions, such arrangement may be employed to purge the apparatus of chlorine as by shutting off the chlorine flow at the valve 13, while permitting suction to build up in the conduit structure leading to the aspirator.

From what has been said above, the operation of the complete apparatus shown in Figs. 1A and 1B should be self-evident. Assuming that the various water, compressed air and gas connections are turned on and that the aspirator 14 is developing the desired suction, the flow control knob 207 may be adjusted to set the apparatus at any desired rate of chlorine flow. Since the instrumentalities controlled by the ball float 80 automatically and accurately adjust the valve 26 to maintain the water level under the bell jar 29 at the desired height D, and thus to maintain a corresponding, constant pressure in such chamber, the prompt adjustment of valve 34 under control of the knob 207 effects the desired control of gas flow. Upon any change in setting of the valve 34, as stated, the valve 26 up-stream of the orifice 30 is automatically adjusted to keep the bell jar vacuum constant. In consequence the flow may be accurately read on the scale 274 at all times, i. e., as represented by the liquid in the manometer 251; and as explained, this reading ought to tally with the setting of the pointer 244 (if the ratio of the force of the spring 224 to its deflection has been suitably adjusted) and the level of the manometer 252. The apparatus will continue to supply chlorine gas at the desired rate for an indefinite period thereafter, or at any different rate to which the controlling device 160 and valve 34 may be adjusted, e. g. by turning the knob 207 and varying the control vacuum with the device 205. To shut down the apparatus, it is only necessary to turn the knob 296 on the shaft of the valve device 280, thereby interrupting operation of the several air-controlled or air-actuated parts and closing both of the valves 26 and 34 in the gas-advancing conduit.

It has been explained above that the maintenance of truly constant pressure under the bell jar by the described instrumentalities is of special importance, both in affording a constant feed of gas regardless of supply pressure changes and the like and in accurate proportionality to the pressure down-stream of the orifice 30, and also in permitting accurate measurement or indication of the flow, in that the density of gas upstream of the metering orifice is thus kept substantially constant for given atmospheric conditions. Moreover, the resulting fixed reading of the manometer 250 facilitates matching the zero reference line of the flow indicating scale 274 to the flow-measuring manometer 251.

In the control of the valve 34, and thus in the actual adjustment of rate of gas feed, the arrangement of the bell 160 utilizing a flow control vacuum is peculiarly advantageous. Being a static vacuum, so to speak, it may be controlled by relatively simple means remote from the apparatus, yet suffer no disadvantages of friction loss, inertia loss or the like in the transmitting or controlled elements. Because the device is operable, by adjustment as shown, to utilize a vacuum (under the bell 160) ranging upwards from zero at zero flow, its control is facilitated, atmospheric pressure being the most convenient datum upon which to base pressures or partial pressures of the magnitude here contemplated. It may be noted that the difference of water levels 153 and 162 can be adjusted by means of the nut 184, i. e. varying the tension of the spring 182 on the lever 170 of the pneumatic valve-actuating device; as above indicated, it is at present preferred that this adjustment be so made that the difference is equal to D, the constant vacuum under the bell jar 29. As also previously explained, the value of this vacuum D in the bell jar chamber is determined by the instrumentalities under control of the ball float 80, and may specifically (and originally) be adjusted by turning the nut 113 so as to vary the tension on the spring 110.

It will be appreciated that the regulating action of the valve 34 as controlled by the chambers 150 and 160 extends also to the maintenance of the desired pressure in the conduit locality 32, against changes in condition (such as a rise or fall in the suction produced by the injector 14) tending to modify such pressure; thus any departure of the pressure in chamber 150 from the value which was selected under control of the vacuum adjusting device 205 unbalances the bell or chamber 160 and causes the pneumatic device 144 to adjust the valve 34 until the predetermined relationship of pressures in the chambers (viz., the pressure difference D) is re-established, i. e. by restoring the negative pressure in the conduit 32 and chamber 150 to the selected value.

Throughout the entire apparatus, all chlorine-carrying passages are thoroughly sealed as are likewise all vessels and chambers which receive water that even at some other place may be exposed to chlorine gas. All necessary venting and communication of atmospheric pressure is achieved through means that may extend remotely to a safe locality, e. g. outside of the building, such means extending from a convenient manifold arrangement (the waste chamber 56) for the several vents and discharge passages. In all respects the apparatus is simple to operate, is reliable and accurate in its feed of gas at the desired rate, and may be effectively rugged in its structural parts.

It is to be understood that the invention is not limited to the specific apparatus herein shown and described, but may be embodied in other forms without departure from its spirit.

I claim:

1. In apparatus for controlling the pressure of gas flowing in a conduit, in combination, a valve adjustable to modify the pressure at a locality of the conduit, means establishing a liquid level in communication with said locality and variable in accordance with the gas pressure thereof, a movable device for displacing the valve, an expansible chamber for exerting force on said device in valve-opening direction, spring means for exerting force on said device in valve-closing direction, means supplying fluid under pressure to said expansible chamber, an outlet valve for said expansible chamber having a valve element movably pivoted to the aforesaid device, for controlling the pressure in said chamber of fluid supplied thereto, a float disposed for positional control by the aforesaid liquid level, means linking the float to said valve element to move same toward closed position upon rise of the liquid level and in an opposite direction upon fall of said level, for respectively corresponding increase and decrease of the force of the expansible chamber on the aforesaid device, said expansible chamber and spring means being thereby cooperatively adapted, under control of the float, to adjust the first-mentioned valve, in a direction to restore the conduit pressure at said locality to a predetermined value, in response to departure of said pressure from said value, stabilizing means connected between said linking means and said movable device for modifying the effective buoyancy of the float in a direction to curtail displacement of the said device upon temporary change in conduit pressure at said locality, said float being adapted to be positionally displaced with displacement of the first-mentioned valve by said device, for further inhibiting restoration of the conduit pressure to said predetermined value, and means controlled by the expansible chamber for controlling the fluid supply means in response to adjustment of said second-mentioned valve, to modify the pressure of fluid supply to the chamber in a direction to effect continued displacement of the movable device, in opposition to the aforesaid effect of the stabilizing means and despite the aforesaid displacement of the float with the first-mentioned valve, for adjusting said valve to complete restoration of the conduit pressure to said value upon a continuing departure.

2. In apparatus for controlling the pressure of gas flowing in a conduit, in combination, a liquid-containing chamber enclosing a space above the liquid which opens to the conduit at a locality thereof, said chamber being arranged for variation of the level of the liquid in accordance with variation of the pressure in the conduit locality, a valve adjustable to modify the pressure at said locality of the conduit, a powered device for adjusting the valve, a control device for initiating and terminating operation of the powered device, a float riding in the liquid in said chamber for operating said control device, said float and control device being adapted, in response to departure of the level of said liquid from a predetermined value, to initiate operation of the adjusting means to adjust the valve in a direction to restore the pressure to said value, said adjusting means including stabilizing means for curtailing the adjusting operation relative to rapid changes of pressure in the chamber, said stabilizing means comprising means applying displacement-impeding force to the float with temporary pressure change, for biasing the control device to halt the pressure-restoring operation with the effective buoyancy of the float modified in a direction to permit change of the water level, and delayed means under control of the adjusting means for modifying the power supplied to said adjusting means, for continuing the valve-adjusting operation of said adjusting means upon a continuing departure of pressure in the chamber, to oppose and overcome the aforesaid buoyancy-modifying effect of the stabilizing means, for completing restoration of the pressure in the chamber to the predetermined value.

3. In apparatus for controlling the pressure of gas flowing in a conduit, in combination, a liquid-containing chamber open to the conduit, a valve in the conduit upstream of said chamber, adjustable to vary the pressure in the chamber, said chamber having means for communication of the liquid therein with a locality of constant pressure so that the level of liquid in said chamber corresponds to the pressure therein, a float in said liquid, and means controlled by said float in response to departure of the level of the liquid therein from a predetermined value, for adjusting the valve to maintain the pressure in the chamber constant at said predetermined value, said last-mentioned means including means connecting the float with the valve so that the float is positionally adjusted with adjustment of the valve, stabilizing means for curtailing the adjusting operation relative to rapid changes of pressure in the chamber, said stabilizing means comprising means for impeding displacement of the float with temporary pressure change in the chamber, for biasing said float to halt the aforesaid adjusting operation when the pressure differs from the predetermined value, and delayed means controlled by the adjusting means and brought into play upon operation of the adjusting means and after predetermined continuance of departure of the chamber pressure from said value, for continuing operation of said adjusting means to continue the adjustment of the valve, despite the tendency of both the positional adjustment of the float and the operation of the stabilizing means to produce change of pressure in the chamber, to restore said pressure to the predetermined value from which it departed and for which the level of liquid is unchanged.

4. In apparatus for controlling the pressure of gas flowing in a conduit, in combination, valve means for controlling the pressure in the conduit at a locality thereof, and control means including a powered driving device therefor and a pressure-responsive device in communication with the conduit at said locality and controlling the driving device, for adjusting the valve means to restore the conduit pressure at said locality to a predetermined value upon departure of said pressure from said value, said control means including stabilizing means immediately responsive to said pressure-responsive device for reducing the adjustment of the valve means in response to a temporary pressure change, and delayed means responsive to continuing departure of the conduit pressure from said value, for modifying power supply to the driving device for continuing the adjustment of the valve means, to effect complete restoration of the conduit pressure to said value, said driving device comprising expansible chamber means for adjusting the valve means, means for supplying fluid under pressure to said expansible chamber means and a valve for said chamber means, adjustable under control of the pressure-responsive device, for varying outlet of fluid from the chamber means to control said driving device, and said delayed means comprising pressure-regulating means in the fluid supplying means, having delayed control means connected to the expansible chamber means, said pressure-regulating means being responsive to change in pressure in said chamber means, for modifying said fluid supply to effectuate the aforesaid modification of power supply to the driving device.

5. In apparatus for controlling the pressure of gas flowing in a conduit, in combination, valve means for controlling the pressure in the conduit at a locality thereof, a control device exposed to the conduit at said locality and responsive to change of pressure in the conduit, means controlled by the control device and connected to the valve means and including a powered driving device, for adjusting the valve means in response to a change of pressure in the conduit, in a direction toward restoration of the pressure to a value from which it has departed, said adjusting means including stabilizing means immediately responsive to pressure change communicated by the control device for reducing the adjustment of the valve means to an extent insufficient to restore the pressure to the value from which it departed, said powered driving device having a control element therefor actuated by the aforesaid control device, and said powered driving device having a power supply connection, and means extending to the power supply connection and including time delay control means therefor controlled by the adjusting means, for modifying power supply to said driving device for continuing operation of the adjusting means, in opposition to said stabilizing means, upon continued existence of a changed pressure in the conduit, to restore the conduit pressure to the aforesaid value from which it departed, said powered driving device comprising an expansible chamber, said control element comprising a valve for controlling outlet of fluid from the expansible chamber, said power supply connection comprising a conduit supplying fluid under pressure to the expansible chamber, and the power supply modifying means comprising a pressure-regulating valve in said last-mentioned conduit, connected through said time delay control means to be controlled by the pressure in said expansible chamber, for modifying the supply of fluid under pressure through said last-mentioned conduit in response to changed pressure in the expansible chamber.

6. In apparatus for advancing gas along a conduit, in combination, valve means for controlling the pressure in the conduit at a locality thereof, means exposed to the conduit at said locality and containing liquid to vary in level with the conduit pressure at said locality, float means in said liquid, movable in response to variations of level thereof, means controlled by the float means and connected to the valve means for adjusting the latter, upon departure of the conduit pressure from a predetermined value, in a direction to restore said pressure to said value, means connected between said float means and said adjusting means for reducing the response of said adjusting means to change of pressure in the conduit, to prevent full response of the adjusting means to momentary pressure changes, and means including a time delay device coupling the same to the adjusting means, for continuing operation of said adjusting means in opposition to said adjustment-reducing means, to restore the conduit pressure completely to said predetermined value upon continuing departure of the conduit pressure from said value, said adjusting means comprising expansible chamber means for adjusting the valve means, means for supplying fluid under pressure to said expansible chamber means and a valve for said chamber means, adjustable under control of the float means, for varying outlet of fluid from the chamber means to control the operation of said adjusting means, and said operation-continuing means comprising pressure-regulating means in the fluid supplying means, connected through said time delay device to be controlled by the pressure in the expansible chamber means, said pressure-regulating means being responsive to change in pressure in said chamber means for modifying said fluid supply to effectuate the aforesaid continued operation of the adjusting means.

7. In apparatus for controlling the pressure of gas flowing in a conduit, in combination, valve means for controlling the pressure in the conduit at a locality thereof, a pressure-sensitive control device exposed to the conduit at said locality and displaceable in response to change of pressure in the conduit, a powered driving device for adjusting the valve means, said powered driving device including expansible chamber means actuated by fluid under pressure, for operation of said driving device in accordance with the fluid pressure in said chamber means, and a control element shiftable to modify the fluid pressure in the chamber means, means connecting the control device in controlling relation to the control element, to modify said fluid pressure for initiating adjustment of the valve means in a direction to restore the conduit pressure to a predetermined value upon departure of the conduit pressure from said value, stabilizing means connected to said connecting means and immediately responsive to said control device upon a pressure change, for modifying the control exerted by said control device on the powered driving device, to curtail the adjustment of the valve means upon a temporary change of conduit pressure, and means including a delay device therefor controlled by the powered driving device upon initiation of its operation, for further modifying the fluid pressure in the chamber means in response to a continued departure of the conduit pressure from the predetermined value, to effect continuing adjustment of the valve means for complete restoration of the conduit pressure to said value, said expansible chamber means having means for supplying fluid under pressure thereto, said control element comprising a valve for varying outlet of fluid from the chamber means, and said last-mentioned fluid pressure modifying means comprising pressure-regulating means in the fluid-supplying means, connected through said delay device to be controlled by the pressure in the chamber means, said pressure-regulating means being responsive to change in pressure in said chamber means, for modifying said fluid supply to effectuate said continuing adjustment of the valve means.

8. In apparatus for controlling the pressure of gas flowing in a conduit, in combination, valve means for controlling the pressure in the conduit at a locality thereof, a pressure-sensitive control device exposed to the conduit at said locality and displaceable in response to change of pressure in the conduit, a powered driving device for adjusting the valve means, said powered driving device including expansible chamber means actuated by fluid under pressure, for operation of said driving device in accordance with the fluid pressure in said chamber means, and a control element shiftable to modify the fluid pressure in the chamber means, means connecting the control device in controlling relation to the control element, to modify said fluid pressure for initiating adjustment of the valve means in a direction to restore the conduit pressure to a predetermined value upon departure of the conduit pressure from said value, stabilizing means connected to said connecting means and immediately responsive to said control device upon a pressure change, for modifying the control exerted by said control device on the powered driving device, to curtail the adjustment of the valve means upon a temporary change of conduit pressure, and means including a delay device therefor controlled by the powered driving device upon initiation of its operation, for further modifying the fluid pressure in the chamber means in response to a continued departure of the conduit pressure from the predetermined value, to effect continuing adjustment of the valve means for complete restoration of the conduit pressure to said value, the aforesaid apparatus being further characterized in that the expansible chamber means includes conduit means for supply of fluid under pressure thereto and the means for further modifying the fluid pressure comprises a pressure regulating valve in said conduit means, having a control chamber communicating with, and responsive to, change of fluid pressure in said expansible chamber means, for effecting an amplified change in fluid pressure in said supply conduit means to said expansible chamber means, said delay device comprising resistance means between the expansible chamber means and said control chamber for delaying communication of said first-mentioned change of fluid pressure.

9. In apparatus for controlling the pressure of gas flowing in a conduit, in combination, valve means for controlling the pressure in the conduit at a locality thereof, a pressure-sensitive control device exposed to the conduit at said locality and displaceable in response to change of pressure in the conduit, a powered driving device for adjusting the valve means, said powered driving device including expansible chamber means actuated by fluid under pressure, for operation of said driving device in accordance with the fluid pressure in said chamber means, and a control element shiftable to modify the fluid pressure in the chamber means, means connecting the control device in controlling relation to the control element, to modify said fluid pressure for initiating adjustment of the valve means in a direction to restore the conduit pressure to a predetermined value upon departure of the conduit pressure from said value, stabilizing means connected to said connecting means and immediately responsive to said control device upon a pressure change, for modifying the control exerted by said control device on the powered driving device, to curtail the adjustment of the valve means upon a temporary change of conduit pressure, and means including a delay device therefor controlled by the powered driving device upon initiation of its operation, for further modifying the fluid pressure in the chamber means in response to a continued departure of the conduit pressure from the predetermined value, to effect continuing adjustment of the valve means for complete restoration of the conduit pressure to said value, the aforesaid apparatus being further characterized in that the powered driving device includes structure movable by the expansible chamber means and connected to the valve means for adjusting said valve means, and in that the stabilizing means comprises spring means connected between said movable structure and the aforesaid connecting means, and constructed and arranged to be selectively tensioned and relaxed in accordance with, and respectively pursuant to the direction of, displacement of the said connecting means by the aforesaid control device, for reducing the effective displacement of the control device in response to change of conduit pressure, said spring means being arranged to be restored in condition upon displacement of said movable structure by the aforesaid further modification of the fluid pressure in the expansible chamber means.

10. In apparatus for controlling the pressure of gas flowing in a conduit, in combination, valve means for controlling the pressure in the conduit at a locality thereof, movable structure for adjusting said valve means, spring means for shifting the movable structure in one direction, expansible chamber means actuated by gas under pressure for shifting said structure in the opposite direction, said expansible chamber means being constructed and arranged for operation, in accordance with the gas pressure therein and in opposition to said spring means, to control the position of said movable structure, vessel means exposed to the conduit at said locality and containing liquid to vary in level with changes of conduit pressure, float means in said liquid, displaceable in response to change of level thereof, said expansible chamber means having valve means to control the gas pressure therein, means connecting said float means with said second valve means for shifting said second valve means to initiate adjustment of the first valve means in a direction to restore the conduit pressure to a predetermined value upon departure of said conduit pressure from said value, stabilizing means controlled by said connecting means and immediately responsive to said float means for curtailing displacement of said movable structure upon a temporary change of conduit pressure, and delayed means controlled by said expansible chamber means and in response to change of gas pressure therein, for modifying the pressure of gas supplied to said expansible chamber means, to continue the initiated adjustment of the first valve means for restoring said conduit pressure to said value upon continuance of departure from said value, the aforesaid apparatus being further characterized in that the stabilizing means comprises a spring extending between the movable structure and the connecting means, said spring being changeable in tension upon adjustment-initiating displacement of the float means, for selectively decreasing and increasing the effective buoyancy of the float means respectively upon rise and fall of the aforesaid liquid level, said spring being connected and arranged for restoration of its tension upon continued displacement of the movable structure in response to operation of the aforesaid delayed means.

11. Apparatus as described in claim 10 which includes a spring extending between the aforesaid connecting means and a stationary support, said spring being arranged to oppose momentary displacements of the float means and being changeable in tension upon said continued displacement of the movable structure for selectively increasing and decreasing the effective buoyancy of the float means upon adjustments of the first valve means responsive respectively to fall and rise of conduit pressure.

12. In apparatus for controlling the pressure of gas flowing in a conduit, in combination, valve means for controlling the pressure in the conduit at a locality thereof, movable structure for adjusting said valve means, spring means for shifting the movable structure in one direction, expansible chamber means actuated by gas under pressure for shifting said structure in the opposite direction, said expansible chamber means being constructed and arranged for operation, in accordance with the gas pressure therein and in opposition to said spring means, to control the position of said movable structure, vessel means exposed to the conduit at said locality and containing liquid to vary in level with changes of conduit pressure, float means in said liquid, displaceable in response to change of level thereof, said expansible chamber means having valve means to control the gas pressure therein, means connecting said float means with said second valve means for shifting said second valve means to initiate adjustment of the first valve means in a direction to restore the conduit pressure to a predetermined value upon departure of said conduit pressure from said value, stabilizing means controlled by said connecting means and immediately responsive to said float means for curtailing displacement of said movable structure upon a temporary change of conduit pressure, and delayed means controlled by said expansible chamber means and in response to change of gas pressure therein, for modifying the pressure of gas supplied to said expansible chamber means, to continue the initiated adjustment of the first valve means for restoring said conduit pressure to said value upon continuance of departure from said value, the aforesaid apparatus being further characterized in that the second valve means is an outlet valve for the expansible chamber means, and in that conduit means are provided for supply of gas under pressure to the expansible chamber means, said delayed means comprising a pressure-regulating valve in said conduit means and means delaying control of said pressure-regulating valve by change of pressure in the chamber means, and said conduit means including a resisting orifice providing a drop in pressure of gas flowing from the regulating valve to the expansible chamber means.

References Cited in the file of this patent

UNITED STATES PATENTS

| Number | Name | Date |
|---|---|---|
| 851,274 | Brent | Apr. 23, 1907 |
| 894,018 | Krichbaum | July 21, 1908 |
| 1,206,806 | Borden | Dec. 5, 1916 |
| 1,583,282 | Denny | May 4, 1926 |
| 1,725,679 | Stein | Aug. 20, 1929 |
| 2,012,978 | Veenschoten | Sept. 3, 1935 |
| 2,020,847 | Mittereff | Nov. 12, 1935 |
| 2,072,314 | Rhodes | Mar. 2, 1937 |
| 2,077,384 | Dettenborn | April 20, 1937 |
| 2,098,914 | Gorrie | Nov. 9, 1937 |
| 2,137,204 | Booth | Nov. 15, 1938 |
| 2,258,758 | Haultain | Oct. 14, 1941 |
| 2,261,245 | Fowler | Nov. 4, 1941 |
| 2,262,539 | Shafer | Nov. 11, 1941 |
| 2,427,235 | Smoot | Sept. 9, 1947 |
| 2,517,820 | Aagaard | Aug. 8, 1950 |

FOREIGN PATENTS

| Number | Country | Date |
|---|---|---|
| 536,242 | Great Britain | May 7, 1941 |